United States Patent [19]

Meur et al.

[11] Patent Number: 4,727,248

[45] Date of Patent: Feb. 23, 1988

[54] OPTOELECTRONIC DETECTOR OF PASSING OBJECTS

[75] Inventors: Jean-Pierre Meur, La Ville Du Bois; Frédéric Vainpress, Paris, both of France

[73] Assignee: SMH Alcatel, Paris, France

[21] Appl. No.: 42,558

[22] Filed: Apr. 24, 1987

Related U.S. Application Data

[63] Continuation of Ser. No. 750,127, Jul. 1, 1985, abandoned.

[30] Foreign Application Priority Data

Jul. 11, 1984 [FR] France ............................ 84 11014

[51] Int. Cl.$^4$ .................................................. G02B 6/42
[52] U.S. Cl. ................................. 250/239; 350/96.20; 250/227
[58] Field of Search ............... 250/239, 227, 551, 221; 350/96.10, 96.14, 96.20, 96.21, 96.22; 372/6; 455/610, 612

[56] References Cited

U.S. PATENT DOCUMENTS

| | | |
|---|---|---|
| 3,014,161 | 12/1961 | Tarczy-Hornoch . |
| 3,892,962 | 7/1975 | Whited ............................ 250/239 |
| 4,268,756 | 5/1981 | Crouse et al. ..................... 250/239 |
| 4,307,934 | 12/1981 | Palmer ............................. 250/227 |
| 4,461,537 | 7/1984 | Raymer, II et al. ............ 350/96.21 |
| 4,479,696 | 10/1984 | Lubin et al. .................... 350/96.20 |

FOREIGN PATENT DOCUMENTS 2044949 10/1980 United Kingdom .

Primary Examiner—Edward P. Westin
Attorney, Agent, or Firm—Sughrue, Mion, Zinn, Macpeak and Seas

[57] ABSTRACT

A device wherein optoelectronic componentry and circuitry is carried on a single component board (70) mounted in a one-piece case (1) having a main section (10) with a compartment (20) therein for accommodating and holding the board and having at the back thereof a hinged flap (16) defining an opening for inserting the board into the compartment and adapted to lock the board in place when closed, and opposite from the flap, a front end terminal part (50) bounding the front of the compartment and provided with passages therethrough issuing into the compartment for insertion of optical fibers (6, 7) and a clamp (68, 8) for holding the fibers. The device is particularly applicable to equip automatic mail sorting machines.

10 Claims, 9 Drawing Figures

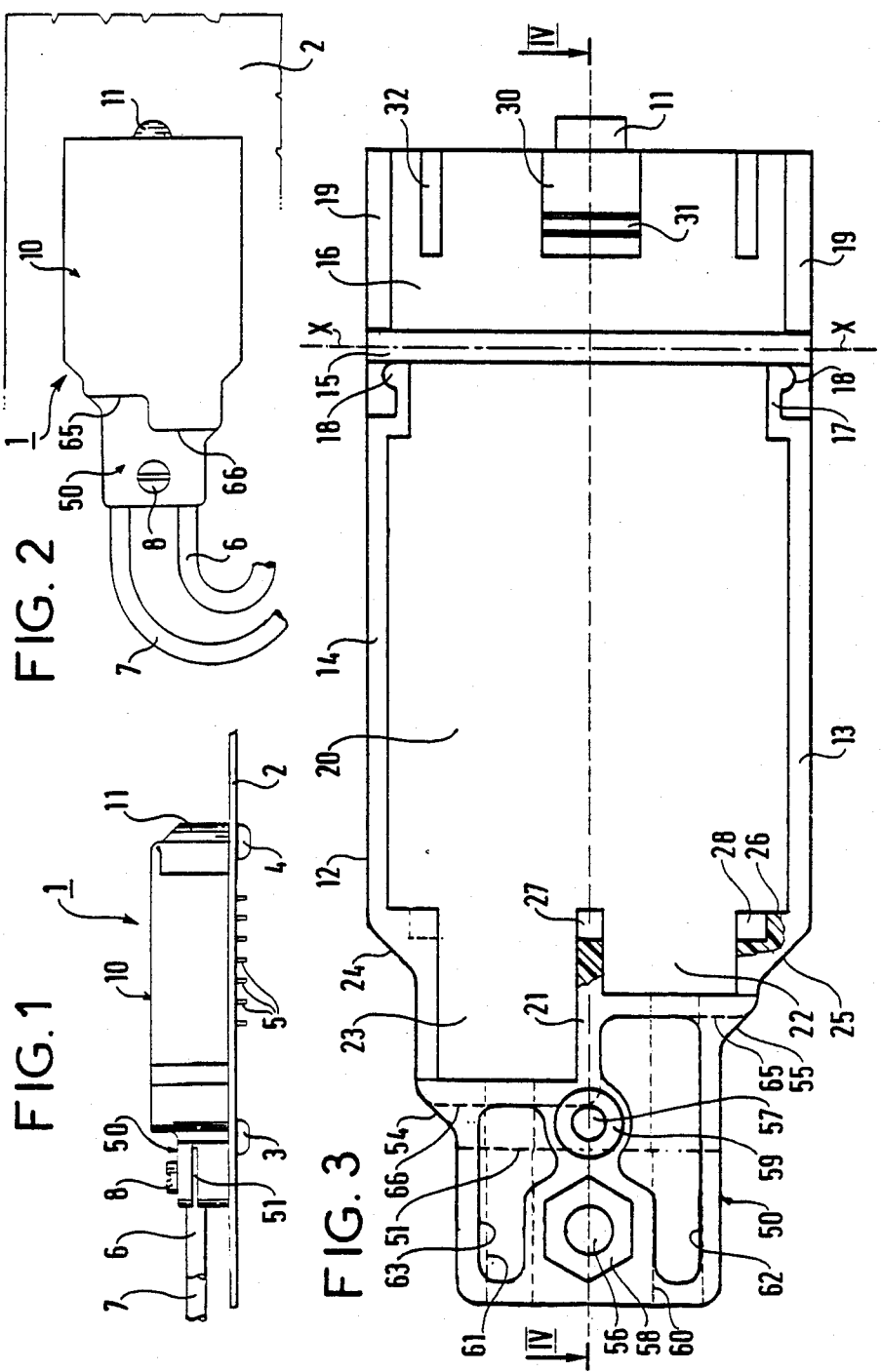

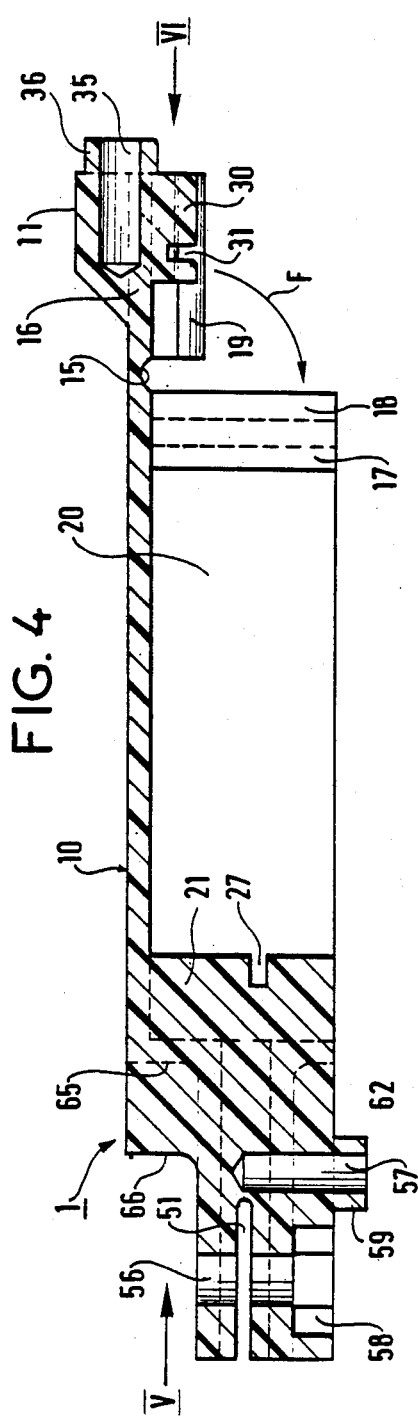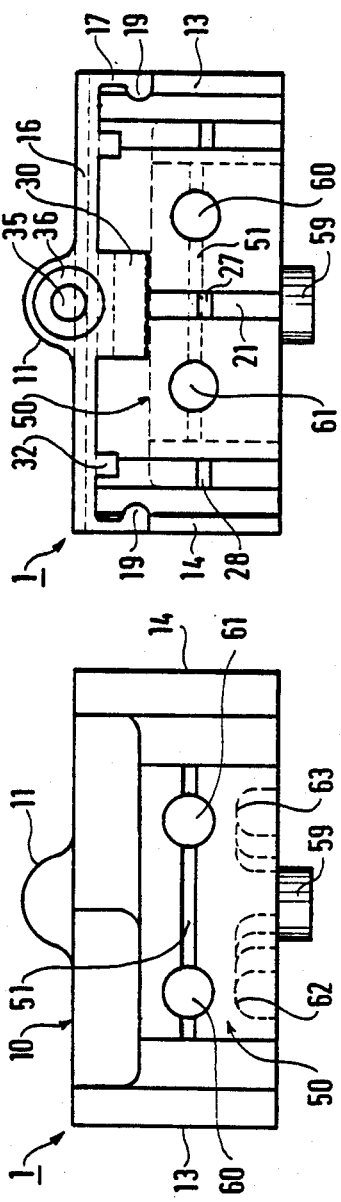

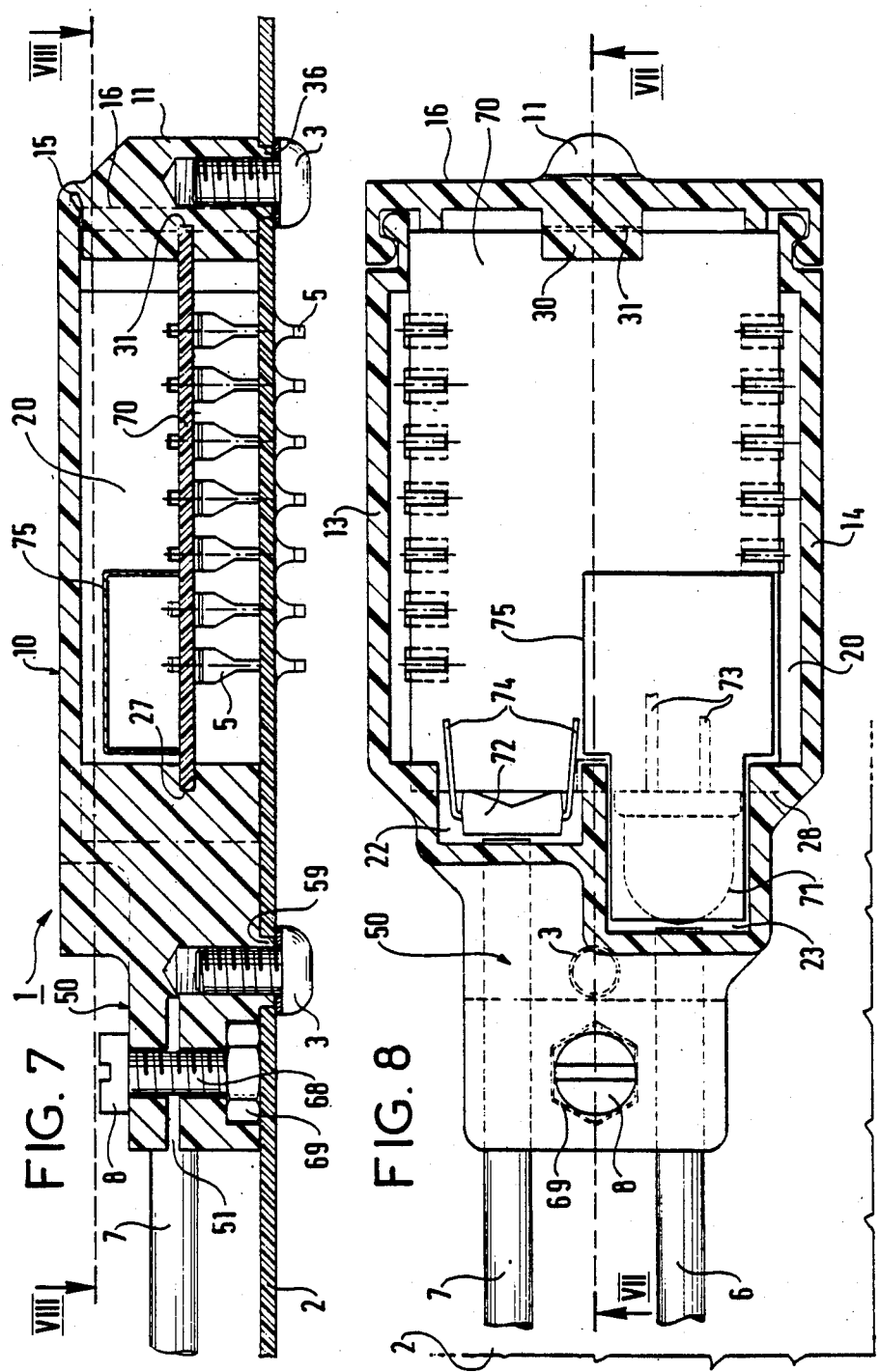

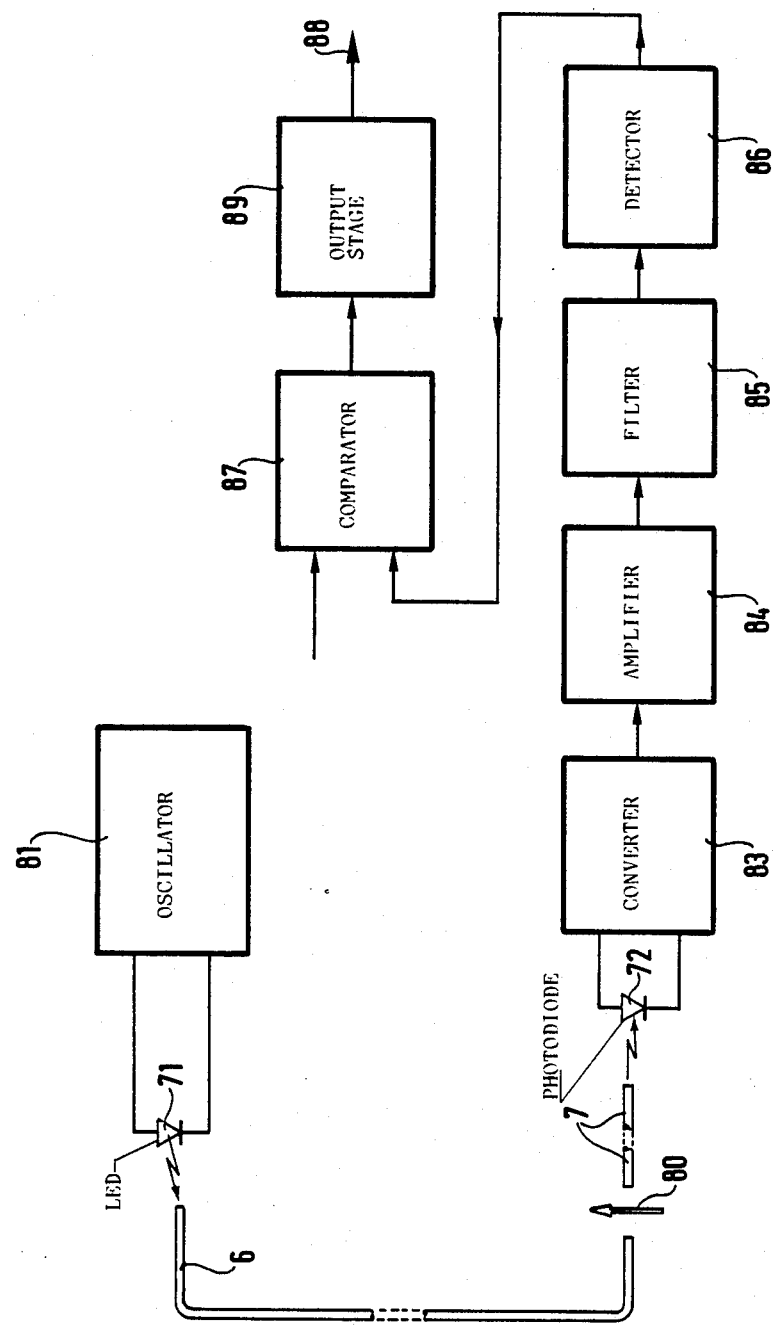

OPTOELECTRONIC DETECTOR OF PASSING OBJECTS

This is a continuation of application Ser. No. 750,127, filed July 1, 1985, now abandoned.

FIELD OF THE INVENTION

This invention relates to optoelectronic devices used to detect the passage of objects therebefore, and specifically to those devices designed to equip automatic processing machines such as mail processing machines in particular.

BACKGROUND OF THE INVENTION

Optical detectors now in use are based either upon the detection of the interruption of the light beam emitted by a light source as an object passes therethrough or upon the detection of the light beam emitted by a light source and reflected to a receiver by a passing object. In detectors of the first-mentioned type, the source and the receiver are disposed opposite one another across the path of the moving objects; in detectors of the second type, the source and the receiver are disposed side by side on the same side of the path followed by the moving objects.

In many optical detectors, the light source is associated with electronic control circuits enabling the light from the source to be differentiated from the ambient light.

Such circuits may comprise an oscillator with a constant cycle ratio and a fixed oscillating frequency on the order of 20 kilo-Hertz, piloting a power stage controlling a visible light emitting diode serving as the light source.

In a similar way, the receiver, consisting of a photodiode, is associated with electronic circuits for processing the received signal, said processing involving signal detection and comparison of the signal with a fixed or variable reference signal. The latter electronics may include a current-to-voltage converter of the signal from the light-receiving photodiode, followed by a power amplifier, a High-pass type filter of the amplified signal, an integrator-type detector to detect a change in signal level resulting from the passage of an object to be detected, a comparator and a signal output stage.

These diode control and signal processing electronics may advantageously be combined with the diode and the photodiode into a single package with optical conduits going therethrough. These optical conduits are factory-installed at the same time as the electronics and the optical devices. They are secured to the walls of the package which they traverse and given a suitable preset length to provide the required linkup, for the specified operating conditions of the resulting, final detector product, between the package's internal components and the facing or side by side object passage detection points. Such a detector or any similar detectors used in an automatic machine are powered through electric cable; their electric signal output is transmitted along a dedicated electric cable to a processing circuit mounted on a printed circuit board, through which automatic control of the machine is enabled. Moreover, the location of such detectors in an automatic machine is determined by the length given said optical conduits.

SUMMARY OF THE INVENTION

The present invention bears upon an optoelectronic device for detecting passing objects, designed to be used in an automatic machine controlled on the basis of these detections, designed according to the established principle of locating the light-emitting and receiving unit some distance away from the object passage detection points by the use of optical conduits, which however obviates any problems concerning the location of the device within a machine formerly resulting from the length that was given to the conduits and furthermore is so designed as to enable the wiring formerly required to link each device with the detector signals processing circuit and with its power supply to be eliminated, such as to yield a very easy to use, compact mass production device.

The invention thus provides an optoelectronic device for detecting the passage of objects, the optoelectronic components whereof are mounted in a package and coupled to optical fibers leading out of the package or case, wherein said optoelectronic components are carried on a single board and said case consists of a unit housing containing a compartment in one section thereof, termed the main section, which accommodates said board and includes means at one end, termed the front end, for positioning and holding said board in place, a front end terminal part bounding the front of said compartment, with passages therein issuing into said compartment for the passage of said optical fibers and cable clamps therein for the purpose of holding said fibers and, at the opposite or back end, a hinged flap defining the opening for insertion of said board in the compartment and operable to lock said board therein.

In one embodiment of the invention, the circuit board carries electrical connecting pins connected to said optoelectronic components which it supports, the outside ends whereof project from the bottom of said case, for direct plug-in to a printed circuit board.

Advantageously, the electronic circuit of the optoelectronic device will be built-in to the in-case circuit board for size reduction purposes and the diode and photodiode components will be mounted on the same side, at the end of the in-case board and connected to the circuit. The resulting device will be considered as a discrete component, mountable on a printed circuit board carrying the processing circuit.

Other features and the advantages of the invention will be more readily apparent from the following detailed description of a preferred embodiment, made with reference to the appended drawings.

BRIEF DESCRIPTION OF THE DRAWINGS

FIGS. 1 and 2 are front and top views, respectively, of the optoelectronic device according to the invention, shown mounted on a printed circuit board;

FIG. 3 is a bottom view of the case of the optoelectronic device, drawn to a larger scale and partly broken out;

FIG. 4 is a sectional view taken along line IV—IV of FIG. 3;

FIG. 5 and FIG. 6 are end views of the case taken in the direction of arrows V and VI respectively of FIG. 4;

FIGS. 7 and 8 are sectional views of the optoelectronic device, taken respectively along line VII—VII of FIG. 8 and line VIII—VIII of FIG. 7;

FIG. 9 is the block diagram of the optoelectronic circuit being part of an optoelectronic device for detecting the passage of objects, in an automatic mail sorting machine.

DESCRIPTION OF THE PREFERRED EMBODIMENT

As shown in FIGS. 1 and 2, the optoelectronic device according to the invention, which is shown mounted as it will be advantageously used in practice, consists of a case 1 housing the optoelectronic equipment of the device, actually hidden from view, and supported on a printed circuit board 2 to which it is attached by means of a pair of screws 3 and 4. Said PC board 2 is actually a processing board for the electric signals generated by the optoelectronic device connected thereto via connector pins 5 projecting from the case 1 and soldered to the PC board 2 circuit, through which pins the optoelectronic device receives its power supply and transmits its electric signal output.

The case 1 itself basically consists of a main section or main part 10 being substantially rectangular-shaped and extending at one end, termed the front end, into a front end terminal part 50. The top of terminal part 50 is stepped down with respect to the level of the top surface of main section 10 and its side walls are indented with respect to those of main section 10, the bottom edges of the side walls of said two parts 10 and 50 being level.

Front end terminal part 50 has a horizontal slot 51 therein substantially a third of the way down from its top surface. The slot 51 receives the ends of two sheathed optical fibers 6 and 7 secured therein by a nut 8 on a clamping system clamping together the two parts of the terminal part defined by said slot, said clamping system serving as a cable grip in said terminal part made elastically deformable.

It can also be seen from the figures that the case 1 is fastened to the PC board 2 with two screws 3 and 4, one of which 3 is inserted through the terminal part 50 between the inside wall of the slot therein 51 and the main section 10 and the other of which is inserted in the wall of the main section 10 opposite the terminal part, otherwise termed the back wall, which is given for this purpose an outside center rib 11 of arcuate contour, running from the top to the bottom of said back all.

FIGS. 3, 4, 5 and 6 give different views of the case 1 designed to receive the optoelectronic equipment, all of which is mounted on the same, single circuit board to form, together with said board, the optoelectronic device according to the invention.

The case 1 consists of a direct-from-the-mold, solid plastic body.

The main section 10 of the case defines a compartment 20, open at the bottom of case 1. The main section 10 consists of a plate or top wall 12 bounded lengthwise by front terminal part 50 and on its sides by two cheeks 13 and 14 which altogether also bound compartment 20 on three sides. The back end of plate 12, opposite terminal part 50, projects beyond cheeks 13 and 14 and has a groove 15 across its inside surface marking off an end piece which forms a deformable fold-down flap 16 hinged about axis X—X (FIG. 3) to make the forth wall of compartment 20, at the back of case 1, when flipped down as indicated by the arrow F in FIG. 4.

Flap 16 is designed to snap onto the back edges of cheeks 13 and 14. For this purpose, each of the vertical ends of said cheeks has catching means such as 17 formed therein, parallel to the plane of the cheek and inwardly located with respect thereto, which terminates in a bulge 18 towards the outside of said compartment. The flap 16 is given a set of mating edges terminating in rounded bulges 19, on the inside surface of plate 12 of which it is a part, to engage behind the bulges 18 of the catching means 17.

At the opposite end of the device from flap 16, the end of front terminal part 50 facing compartment 20 forms a set-back extending a short way substantially along the centerline of the compartment, establishing a substantially centered, vertical partition 21 within the front end of said compartment. Said partition 21, together with the portions of cheeks 13 and 14 facing it, defines two subcompartments 22 and 23 whose forward walls are staggered with respect to terminal part 50.

Advantageously, the subcompartmentalized front end of case 1 is narrower than the compartment 20 but wider than front terminal part 50. Two oblique wall portions 24, 54 and 25, 55 effect this taper on the outside of each side of the device and, on the inside of compartment 20, a shoulder such as 26 is provided on each of the cheeks, in line with the end of partition 21, to effect the transition between the narrower, subcompartmentalized front end of the case 1 and the compartment 20, giving the cheeks 13, 14 a greater thickness at these points.

The end of partition 21 is given a shallow, horizontal slot 27 half-way up the height of the case. A notch 28 is provided in each cheek 13, 14, in the shoulder 26 therein, in line with the end of partition 21 and at the same level as slot 27. These notches and slots 27 serve to hold the optoelectronic component board 70 when it is inserted into compartment 20 and its front edge and two front corners engaged in the corresponding slots and notches.

To further maintain such an optoelectronic component board, flap 16 is provided with a center rib 30 on its inside or compartmentside face. Said rib is given a horizontal slot 31 roughly at the center of the flap, just like slot 27 in partition 21, which aligns with slot 27 and notches 28 when the flap is folded down to close the compartment. Said slot 31 receives the back edge of the optoelectronic component board whose front edge has been previously inserted into slot 27 and notches 28, when flap 16 is folded down and snaps into catching mean 17 on the cheeks.

Flap 16 is further provided with two ribs such as 32 on the same side of the flap as rib 30 and arranged one to each side of rib 30, parallel to the small sides of the flap. These have a rectangular cross-section, and are less salient than rib 30, reaching slightly beyond the level of the inside wall of slot 31. When the optoelectronic component board is inserted into compartment 20 and flap 16 is folded down to close the back of said compartment, said ribs 32 come to bear against the back edge of the component board 70 and act as stops further maintaining the board in place within the compartment.

In addition it can be seen that the rib 11 on case 1 (FIGS. 1 and 2) is formed on the opposite face of flap 16 from that carrying rib 31. FIGS. 4 and 6 in particular reveal that said rib 11 contains a blind hole 35 opening towards the unhinged end of the flap and extending within a cylindrical nipple 36 at the end of the flap.

Front end terminal part 50 now, forms a small block in front of main section 10. Said block, taken in the direction of the height of case 1, includes a through-hole 56 and a blind hole 57 opening at the bottom f the case (FIGS. 3 and 4). The two holes 56 and 57 are substantially aligned, with centers in the vertical center plane of partition 21. Whereas through-hole 56 issues at the bottom of case 1 in a large, hexagonal opening 58, designed to accommodate the head of a through-bolt and lock said bolt against rotation, blind hole 57 extends beyond the level of the bottom of case 1 into a cylindrical nipple 59.

Taken in the lengthwise direction of case 1, said block includes, in addition to the aforementioned slot 51, two holes 60 and 61 issuing at the front of the case and in compartment 20, to either side of partition 21 (FIGS. 3 and 5). Said two holes 60, 61 have centers in the center plane of slot 51 which cuts through part of their length. They serve as a termination for the two optical fibers 6 and 7 shown in FIGS. 1 and 2.

In the bottom panel of case 1, said block also has two recessed cavities 62 and 63, one on each side of holes 56 and 57, which cavities are aligned respectively with optical fiber termination holes 60 and 61. Said cavities 62 and 63, sealed off from the front and sides of the case, afford sufficient deformation to the front terminal part 50, at the level of holes 60 and 61, for securing the fibers therein without the risk of said fibers being crushed or damaged during tightening of the clamping parts defined by slot 51. As can be seen from FIG. 3 in particular, cavity 62, which corresponds to the shallower subcompartment 22 in the front end of compartment 20, is longer than cavity 63.

In FIGS. 2, 3 and 4, it can be seen that the top of said block, which lies below the level of the top of the case as a whole, conforms to the profile established by the front end walls of the two subcompartments, as represented by the two staggered shoulders 65 and 66 which it forms with the topmost part of the case.

FIGS. 7 and 8 illustrate the resulting optoelectronic device. The optoelectronic components of the device are mounted on component board 70 which is inserted in the slots and notches purposely provided in the front of the compartment and the slot 31 in rear flap 16 when the latter is folded down and snapped shut against cheeks 13 and 14, and which is locked in place in the compartment by the stops 32 on the shut flap.

Component board 70, as carried in case 1, carries the various components of optoelectronic equipment, preferably mounted as hybrid circuits on the top thereof, which are not shown in the drawing. On the front end of the board are mounted a light-emitting diode 71 and photodiode 72 whose respective electric leads, such as 73 for the diode and 74 for the photodiode, are connected on the adjacent part of the board to the board-mounted hybrid circuits. Said diode and photodiode thus fit into separate subcompartments 23 and 22 in the front end of compartment 20 when the component board 70 is inserted.

A shield 75 mounted on board 70 covers diode 71 and extends from subcompartment 23, which houses the diode 71, into compartment 20 on the board 70, closing off said compartment 20 from the diode to better isolate the photodiode. Said shield 75 is open at the front; its front part, which covers the diode, engages in subcompartment 23 and lines the subcompartment's top and side walls. The shield is closed at the back and its back part, on the component board, extends from partition 21, and follows the corresponding edge of the board and lines the corresponding top wall of compartment 20.

Said board 70 mounted in the case also carries the connector pins 5 already mentioned, which are vertically arranged in two rows along the underside of its two longitudinal edges and connected through it to the components thereon. The ends of said pins 5 project beyond the bottom of the case.

Besides the component board 70 thus equipped and mounted in compartment 20, the case 1 receives, in its front end terminal part 50, the two optical fibers 6 and 7. Said fibers, once slipped into their respective terminations, have ends projecting into subcompartments 22 and 23, in front of diode 71 and the sensitive surface of photodiode 72 respectively. They are locked into the front terminal part by tightening nut 8 onto the end of hex-head bolt 68, whose hexagonal head 69 is snugly arranged against rotation in the bottom of said part 50.

This type of fitting of the optical fibers to couple them to the diode and the photodiode and hold them in place within the case, is especially easy to implement. It has two main advantages: it can be carried out in the field, or at the side of utilization of the device and, more importantly, it affords the possibility of using optical fibers dispensed from a payout reel or similar device and cut to the desired length at the time of utilization of the device and thus to suit its specific location in the machine, as decided at this time.

In practical use, the case 1 equipped with its optoelectronic component board and its optical fibers respectively coupled to the diode and the photodiode carried by said board, can be very advantageously mounted as a component on the printed circuit board 2 carrying a processing circuit, not shown. The aforementioned screws 3 and 4 ensure its fastening when they are inserted into their respective mounting holes 57 and 35 in the case (FIG. 4), through said board 2. At the time of such assembly, the ends of pins 5 go through the plated-through holes provided therefor in the PC board and are soldered in place.

The equipped case 1 is further locked in place on board 2 with the help of said previously-mentioned cylindrical nipples 59 and 36 projecting from the bottom of its front terminal part 50 and from the end of closing flap 16, which engage in corresponding openings in the board. Said nipples furthermore prevent any straining of pins 5 at the time of assembly and of inserting screws 3 and 4, which might damage their connections with the optoelectronics.

FIG. 9 diagrams an optoelectronic circuit mounted on aforementioned component board 7 of the device illustrated in FIGS. 7 and 8. This circuit is in effect a detector circuit for passing objects, intended specifically for an automatic mail sorting machine.

Diode 71 is shown coupled to one optical fiber 6, termed the emitting fiber and diode 72 is shown coupled to its fiber 7, termed the receiving fiber. An arrow 80 symbolizes a moving object to be detected as it passes between the open ends of the fibers.

Diode 71 in this circuit is controlled by an oscillator and power stage 81. The light emitted by the diode, preferably in the visible spectrum near the infrared range, is thus chopped to differentiate it from the ambient light and sent on to the detection point through the emitting fiber.

Photodiode 72 is connected to a current-to-voltage converter 83 followed by an amplifier 84 and a filter 85. Said filter is connected to a detector 86, itself connected to a comparator 87. The signal from the comparator is delivered by an output 88, through an output stage 89, for suitable utilization. Filter 85 serves to screen out spurious frequencies contained in the signal output from the photodiode. Detector 86 ensures detection of changes in this filtered signal resulting from the passage of an object before the receiving fiber. It consists of an integrator circuit. In the comparator, the level of the received signal carrying detection intelligence is compared with a fixed or adjustable reference signal. The signal supplied reflects the passage or nonpassage of an object before the receiving fiber. Transmission of the signal generated by the comparator to the utilization circuit is done via the output stage. The circuit just described, associated with diode 71 and photodiode 72, as a whole is advantageously integrated onto the aforementioned component board 70. The resulting optoelectronic device with its fibers direct-coupled to the diode and the photodiode can be plugged in directly to any processing circuit PC board and can thus be considered, with respect to such PC board, as a discrete component. This avoids all the potential problems associated with its electrical wiring for power supply purposes on the one hand and for processing of its intelligence signals on the other hand.

The invention has been described with reference to the specific embodiment illustrated in the drawings. Obviously however, various modifications could be made in detail and/or certain means described could be replaced by equivalent means by anyone knowledgeable in the art without departing from the scope and spirit of the invention as defined by the following claims.

What is claimed is:

1. An optoelectronic device for detecting at a distance the passage of objects comprising: a component board carrying on a single surface of said board optoelectronic components consisting of a light source and a photodetector arranged substantially side by side at a first end of said board and associated components mounted in hybrid circuits on said surface of said board, a unitary molded plastic case having a main section including an open bottom compartment for receiving said board, and a front end terminal part which extends to one side of said main section, said case compartment being limited by a top wall and laterally by said front end terminal part, an opposite rear wall, and two side walls, said case having means for holding said component board in position such that such compartment is substantially closed by said component board and being provided with a substantially centered partition extending from the front end terminal part into said open bottom compartment and defining two subcompartments for receiving the light source and the photodetector, respectively, said front end terminal part being provided with two holes opening into said two subcompartments respectively on an external opposed face, and two optical fibers mounted and clamped within said two holes respectively, in axially alignment with said light source and said photodetector said rear wall being a continuation of said molded plastic case top wall and including a transverse groove molded therein to define a rear wall hinged flap pivotable about said groove.

2. Device according to claim 1 wherein said light source comprises a light emitting diode, a shield is mounted on said board surrounding said diode and closes off said subcompartment receiving said diode.

3. Device according to claim 1, wherein said component board carries electrical connector pins connected to said optoelectronic components with the free ends of said pins projecting beyond the bottom of said case to enable direct plug-in of the device to a further printed circuit board.

4. Device according to claim 1, wherein said rear wall hinged flap is pivotable into a position in line with said top wall to thereby form an opening for insertion of the component board in the compartment, wherein said hinged flap comprises a rib on a compartment-side surface of said hinged flap and means for positioning and holding said component board including two slots located at substantially mid-height of the case, one slot being provided an inward-facing end of said partition and the other slot being in said rib of said hinged flap.

5. Device according to claim 4, wherein said board positioning and holding means further comprise notches provided at the same height as said end slots, in shoulders formed on the inside of the side walls of said compartment at the front of said compartment.

6. Device according to claim 4, wherein said flap has opposed lateral edges, and the edges of said flap and the edges of the adjacent side walls of the case bounding said compartment comprise mateable snap-in profiles.

7. Device according to claim 6, wherein said front end terminal part comprises a deep slot cutting across part of the length of said two holes within said front end terminal part and said front end terminal part further includes a through-hole perpendicular to said deep slot, and bolt and nut means carried by said through-hole to effect clamp-like tightening of said fibers by deformation of the front end terminal part and constituting said clamping means.

8. An optoelectronic device for detecting at a distance the passage of objects comprising:
a component board having opposite faces and a first and second end, and carrying on one face of said board optoelectronic equipment consisting of a light source and a photodetector arranged substantially side by side at said first end and having associated components mounted in hybrid circuits on said one face of said board, a unitary body having a main section part defining an open bottom compartment for receiving said component board with said optoelectronic equipment and a front end terminal part which extends on one side of said main section part and in which body: said compartment is delimited by a top wall, and laterally by said front end terminal part, an opposite rear wall, and two side walls and extending between said front end terminal part and said opposite rear wall at opposite ends thereof and providing an open bottom, said body being provided with a substantially centered partition extending from the front end terminal part into said compartment and defining two subcompartments for housing the light source and photodetector, respectively, said front end terminal part being provided with two holes opening into said two subcompartments, respectively, and having mounted on an external, opposed face thereof, two optical fibers, said two optical fibers being clamped within said two holes, respectively, in axial alignment with said light source and said photodetector.

9. A device according to claim 8, wherein said component board carries electrical connector pins connected to said optoelectronic components, said electrical connector pins having free ends projecting from said component board other face at right angles to the component board, said pins extending beyond the plane defined by the open bottom of said unitary body first, main section to enable direct plug in of the device via the ends of the pins to a printed circuit board underlying the open bottom compartment of said main section part of said unitary body.

10. A device according to claim 8, wherein said unitary body is formed of molded plastic and wherein said rear wall is deformable and said unitary body comprises means for positioning and holding said component board including two slots located at substantially mid height of the unitary body, one slot being provided on an inwardly facing end of said front end terminal part and the other slot being within said rear wall such that said component board is inserted into said open bottom compartment through the open bottom thereof, upon deformation of said deformable rear wall, with said first and second ends of said component board fitted within respective slots.

* * * * *